No. 867,614. PATENTED OCT. 8, 1907.
B. C. SEATON.
WHEEL.
APPLICATION FILED JUNE 7, 1906.
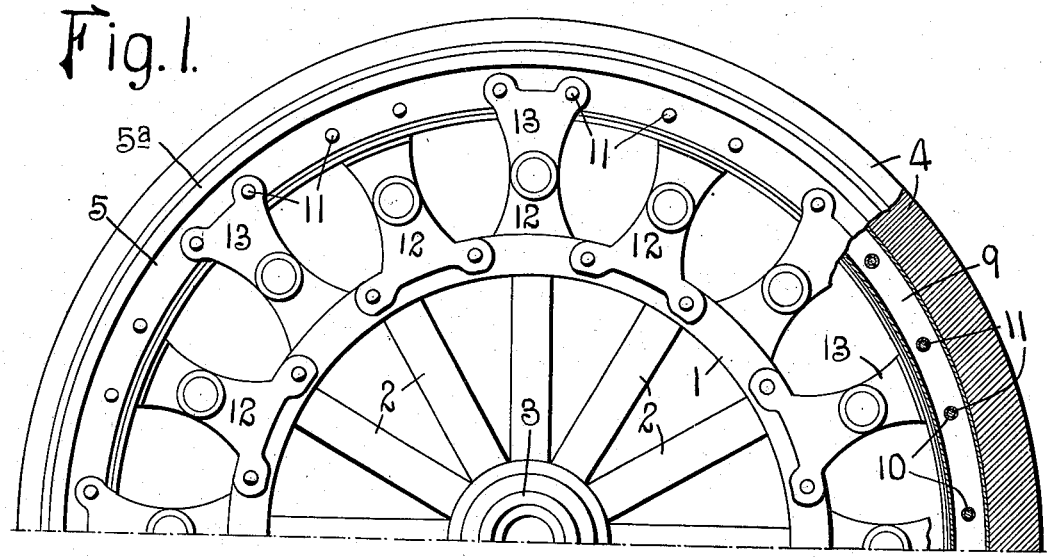
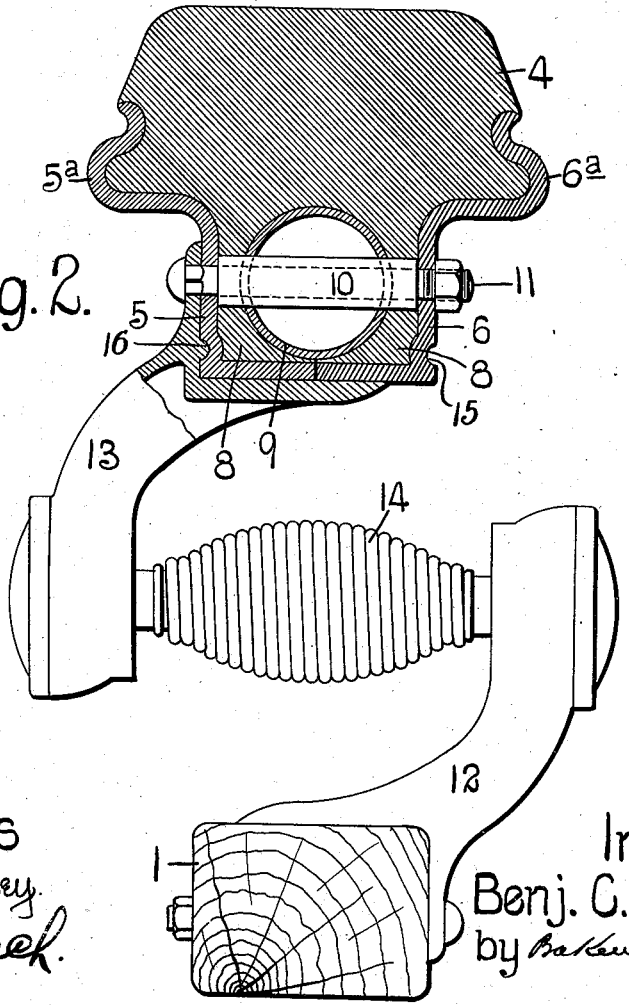
Witnesses
A. J. McCauley
Nells L. Church
Inventor:
Benj. C. Seaton
by Bakewell Cornwall
Att'ys.

UNITED STATES PATENT OFFICE.

BENJAMIN COPLIN SEATON, OF ST. LOUIS, MISSOURI.

WHEEL.

No. 867,614.   Specification of Letters Patent.   Patented Oct. 8, 1907.

Application filed June 7, 1906. Serial No. 320,669.

*To all whom it may concern:*

Be it known that I, BENJAMIN COPLIN SEATON, a citizen of the United States, residing at St. Louis, Missouri, have invented a certain new and useful Improvement in Wheels, of which the following is a full, clear, and exact description, such as will enable others skilled in the art to which it appertains to make and use the same, reference being had to the accompanying drawings, forming part of this specification, in which—

Figure 1 is a side elevation of a portion of a wheel embodying the features of my invention; and Fig. 2 is an enlarged sectional view through a portion of the wheel.

This invention relates to wheels, and particularly to wheels of the type shown in my prior United States Patent No. 814,737, of March 13, 1906, although some of the features of my invention are not limited to use with wheels of that type.

The wheel shown in my prior patent above referred to consists of a felly having an inner rim connected thereto, an outer rim which carries a rubber tire or tread, and transversely arranged springs connected to the outer and inner rims.

The object of my invention is to provide a wheel consisting of an outer tread-carrying rim of novel construction, a felly, coöperating arms connected to said outer rim and felly, and transversely arranged tension springs connected to said coöperating arms.

Referring to the drawings which represent the preferred form of my invention, 1 designates the felly of a wheel connected by spokes 2 to the hub 3. The outer rim which carries the rubber tread 4 is made up of two metallic sections 5 and 6 which are preferably of the form shown in Fig. 2 wherein it will be seen that one-half of each section is approximately L-shaped in cross section so that when the sections are placed together they will coöperate to form a channel while the other half of each section consists of an irregularly curved flange which is approximately S-shaped in cross section, the flanges of the respective sections being designated by the reference characters 5$^a$ and 6$^a$.

The tire or tread 4 is preferably of rubber and conforms to the contour of the curved flanges 5$^a$ and 6$^a$, said tire being provided with L-shaped attaching members 8 that embrace a tubular metallic member 9 arranged between the sections 5 and 6 that constitute the outer rim, as shown in Fig. 2.

Sleeves 10 extend transversely through openings in the attaching members 8 of the tire and through the tubular member 9, and bolts 11 which extend through said sleeves and through the sections 5 and 6 bind all of said members securely together so that it will be impossible for the tire to creep or buckle. The tubular member 9 not only prevents the tire from buckling but as said member occupies a great deal of the space between the channel-shaped portion of the outer rim, the cost of manufacturing the tire is reduced greatly on account of the great saving in the quantity of rubber that is used in the tire.

Arms 12 are connected to the felly and are arranged alternately on opposite sides thereof, as shown in Fig. 1, and coöperating alternately arranged arms 13 are connected to the outer tread-carrying rim, coiled tension springs 14 being connected to the coöperating arms of the felly and outer rim in substantially the same manner as the springs shown in my prior United States Patent above referred to, the principal difference between the two constructions being in the use of separate arms 12 and 13 which can be manufactured at less cost and also present a more ornamental appearance than the construction shown in my prior patent in which the springs were connected to continuous vertical flanges having sinusoidal-shaped edges.

Preferably, each of the sections 5 and 6 which constitute the outer rim is provided with a circumferentially extending groove or recess 15 and the arms 13 are provided with transversely extending ribs 16 which enter said grooves and thus absolutely prevent the arms from twisting.

Having thus described my invention, what I claim as new and desire to secure by Letters Patent is:

1. A wheel comprising a felly, an outer rim having a tread connected thereto, a plurality of independent arms formed separate from the felly to which they are connected and arranged alternately on the opposite sides thereof, independent arms formed separate from the outer rim to which they are connected and arranged alternately on the opposite sides thereof, transversely arranged tension springs connected to the arms on the felly and outer rim that are located opposite each other, and coöperating means on the outer rim and the arms connected thereto for preventing said arms from twisting; substantially as described.

2. A wheel comprising a felly, an outer rim having a tread connected thereto, independent arms connected to the felly and arranged alternately on the opposite sides thereof, independent arms connected to the outer rim and arranged alternately on the opposite sides thereof, ribs on said arms coöperating with recesses in the outer rim, and transversely arranged tension springs connected to the arms on the felly and outer rim that are located opposite each other; substantially as described.

In testimony whereof, I hereunto affix my signature, in the presence of two witnesses, this 31st day of May 1906.

BENJAMIN COPLIN SEATON.

Witnesses:
F. W. MAYER,
HELEN CUSHWA.